US012538078B2

(12) United States Patent
Shinmen et al.

(10) Patent No.: US 12,538,078 B2
(45) Date of Patent: Jan. 27, 2026

(54) EDGE, SPEAKER UNIT, MICROPHONE, AND ACOUSTIC PROCESSING DEVICE

(71) Applicant: SONY GROUP CORPORATION, Tokyo (JP)

(72) Inventors: Naoki Shinmen, Tokyo (JP); Shunsuke Shiomi, Tokyo (JP); Go Igarashi, Tokyo (JP); Yuta Sato, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 279 days.

(21) Appl. No.: 18/254,937

(22) PCT Filed: Oct. 28, 2021

(86) PCT No.: PCT/JP2021/039790
§ 371 (c)(1),
(2) Date: May 30, 2023

(87) PCT Pub. No.: WO2022/123945
PCT Pub. Date: Jun. 16, 2022

(65) Prior Publication Data

US 2024/0022860 A1 Jan. 18, 2024

(30) Foreign Application Priority Data

Dec. 7, 2020 (JP) ................................ 2020-202769

(51) Int. Cl.

| | |
|---|---|
| ***H04R 7/18*** | (2006.01) |
| ***H04R 1/10*** | (2006.01) |
| ***H04R 7/12*** | (2006.01) |

(52) U.S. Cl.
CPC ............ *H04R 7/18* (2013.01); *H04R 1/1075* (2013.01); *H04R 7/12* (2013.01)

(58) Field of Classification Search
CPC ........... H04R 7/12; H04R 1/1075; H04R 7/18
See application file for complete search history.

(56) References Cited

U.S. PATENT DOCUMENTS

2011/0194724 A1* 8/2011 Watanabe ................ H04R 9/06 381/398

FOREIGN PATENT DOCUMENTS

| | | | |
|---|---|---|---|
| JP | 59-111389 U | | 7/1984 |
| JP | S59111389 U | * | 7/1984 |
| WO | 2009/107192 A1 | | 9/2009 |
| WO | 2019/021669 A1 | | 1/2019 |

OTHER PUBLICATIONS

International Search Report and Written Opinion of PCT Application No. PCT/JP2021/039790, issued on Feb. 1, 2022, 09 pages of ISRWO.

* cited by examiner

*Primary Examiner* — Sunita Joshi
(74) *Attorney, Agent, or Firm* — CHIP LAW GROUP

(57) ABSTRACT

To provide an edge and the like that improve sound quality. The edge includes an edge-shaped portion that is formed from an inner peripheral portion to an outer peripheral portion, and a groove portion that is formed in the edge-shaped portion and has a peak portion and a valley portion, wherein a ridge line of the valley portion of the groove portion extends from a start point on the inner peripheral portion side to an end point on the outer peripheral portion side so as to draw a continuously changing curve.

18 Claims, 18 Drawing Sheets

20R

20R

EDGE, SPEAKER UNIT, MICROPHONE, AND ACOUSTIC PROCESSING DEVICE

CROSS REFERENCE TO RELATED APPLICATIONS

This application is a U.S. National Phase of International Patent Application No. PCT/JP2021/039790 filed on Oct. 28, 2021, which claims priority benefit of Japanese Patent Application No. JP 2020-202769 filed in the Japan Patent Office on Dec. 7, 2020. Each of the above-referenced applications is hereby incorporated herein by reference in its entirety.

TECHNICAL FIELD

The present disclosure relates to an edge, a speaker unit, a microphone, and an acoustic processing device.

BACKGROUND ART

A configuration in which a diaphragm is attached to a frame via an edge has been known as a speaker unit. As the shape of the edge, a rolled edge with a semicircular cross-section and a rolled edge with two semicircles have been known. The edge has a damping effect on the diaphragm. Furthermore, since the edge itself vibrates as well, the edge functions as part of the diaphragm. From these points of view, the impact of the edge on the sound quality of a reproduced sound from the speaker is not small. In light of this point of view, the following PTL 1 describes a technique of reducing distortion of a reproduced sound by forming, on the edge, an inner notch and an outer notch that form a predetermined angular relationship.

CITATION LIST

Patent Literature

PTL 1
WO 2019/021669

SUMMARY

Technical Problem

In this field, further improvement of the sound quality is desired.

One of the objects of the present disclosure is to provide an edge, a speaker unit, a microphone, and an acoustic processing device that improve sound quality.

Solution to Problem

The present disclosure is, for example, an edge, including:

an edge-shaped portion that is formed from an inner peripheral portion to an outer peripheral portion; and a groove portion that is formed in the edge-shaped portion and has a peak portion and a valley portion, wherein a ridge line of the valley portion of the groove portion extends from a start point on the inner peripheral portion side to an end point on the outer peripheral portion side so as to draw a continuously changing curve.

The present disclosure is, for example, a speaker unit, including:

a diaphragm that is displaced by a drive signal; and an edge that supports the diaphragm, wherein the edge includes:

an edge-shaped portion that is formed from an inner peripheral portion to an outer peripheral portion; and a groove portion that is formed in the edge-shaped portion and has a peak portion and a valley portion, wherein a ridge line of the valley portion of the groove portion extends from a start point on the inner peripheral portion side to an end point on the outer peripheral portion side so as to draw a continuously changing curve.

The present disclosure is, for example, a microphone, including:

a diaphragm that is displaced by sound pressure; and an edge that supports the diaphragm, wherein the edge includes:

an edge-shaped portion that is formed from an inner peripheral portion to an outer peripheral portion; and a groove portion that is formed in the edge-shaped portion and has a peak portion and a valley portion, wherein a ridge line of the valley portion of the groove portion extends from a start point on the inner peripheral portion side to an end point on the outer peripheral portion side so as to draw a continuously changing curve.

The present disclosure may be an acoustic processing device that has the speaker unit and the microphone described above.

DESCRIPTION OF EMBODIMENTS

Hereinafter, embodiments of the present disclosure will be described with reference to the drawings. The description will be made in the following order.

<Issues to be considered in present disclosure>

<One embodiment>

<Modification>

The embodiments to be described below are preferred specific examples of the present disclosure and content of the present disclosure is not limited to the embodiments.

Issues to be Considered in Present Disclosure

First, in order to facilitate understanding of the present disclosure, issues to be considered in the present disclosure will be described.

A speaker unit used in a speaker device includes a diaphragm that is displaced in response to a drive signal. The diaphragm is attached to a frame via an edge. Incidentally, deformation of the edge that occurs when the diaphragm is displaced can degrade the sound quality of a reproduced sound reproduced by the speaker unit. This point will be explained with reference to FIGS. 1A, 1B, and 2. In the graph shown in FIG. 2, the horizontal axis indicates displacement and the vertical axis indicates the magnitude of a force (reaction force).

Figure 1A:
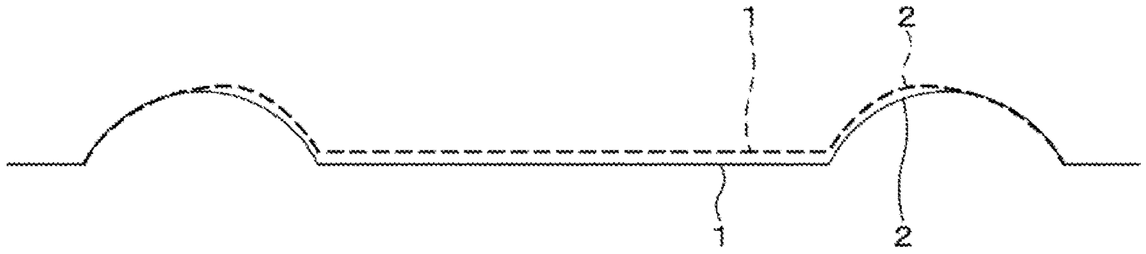
FIGS. 1A and 1B are diagrams to which reference is made when issues to be considered in the present disclosure are explained.
Figure 1B:

FIGS. 1A and 1B show a simplified diagram of a diaphragm (diaphragm 1) and an edge (edge 2) attached to the diaphragm 1. The dotted lines in FIGS. 1A and 1B show the positions of the diaphragm 1 and the edge 2 when they are displaced.

Figure 2:
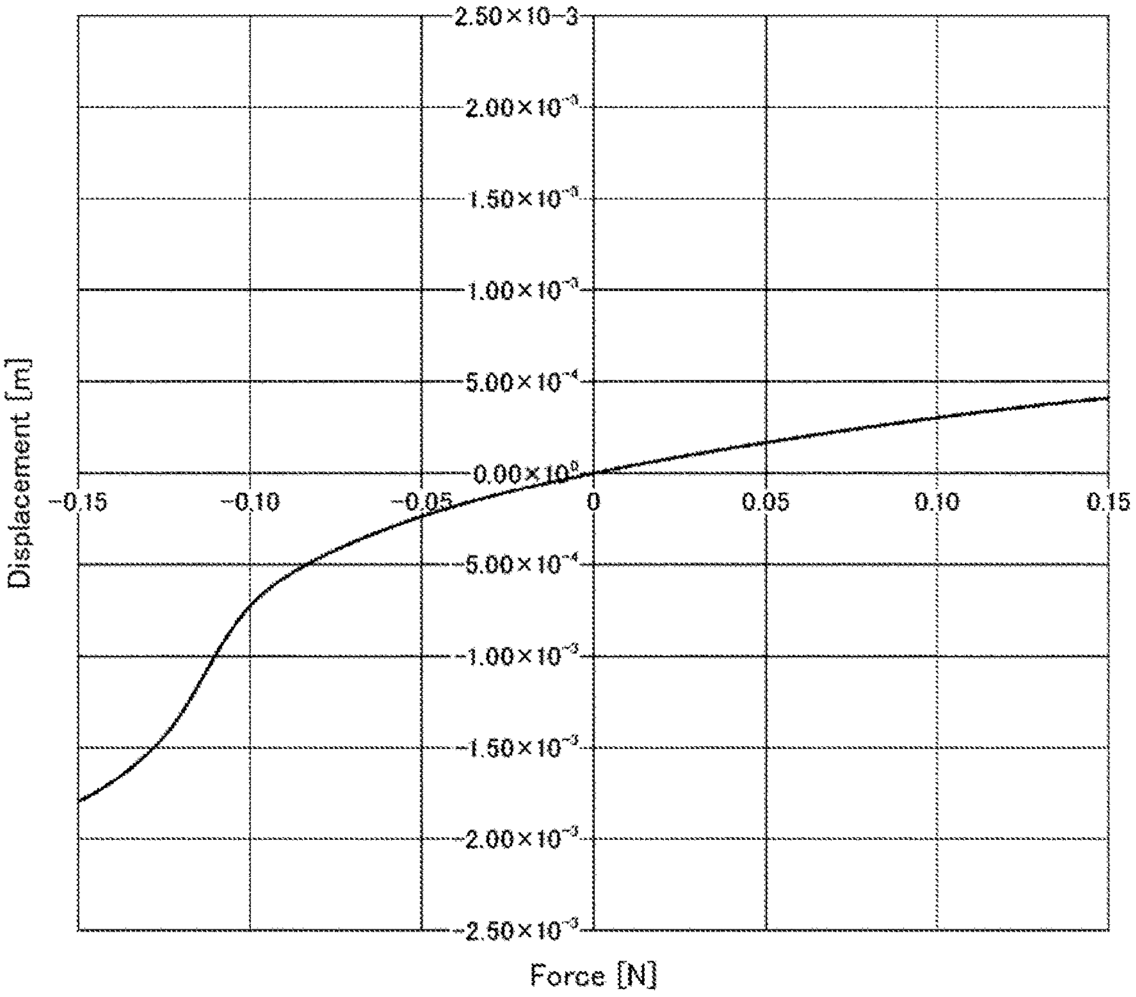
FIG. 2 is a diagram to which reference is made when issues to be considered in the present disclosure are explained.

As shown in FIG. 1A, when the diaphragm 1 is displaced forward, the edge 2 opens in a direction in which the radius thereof expands. Conversely, when the diaphragm 1 is displaced backward, the edge 2 closes in a direction in which the radius thereof becomes small. As a result, as shown in FIG. 2, the relationship between amplitude and reaction force becomes asymmetrical, and this asymmetry distorts the reproduced sound. It can also be seen that as the amplitude increases, the asymmetry increases and the linearity worsens (non-linearity).

A damper-less speaker unit is also used in a headphone, an earphone, and the like. In such a speaker unit as well, the diaphragm is attached to the frame via an edge. The edge has a damping effect on the diaphragm and plays a role in supporting the diaphragm, and the edge itself also functions as part of the diaphragm by vibrating. This configuration is very effective for making the speaker unit smaller and thinner, reducing the weight of the vibration system and increasing the sound pressure sensitivity. However, such damper-less speaker unit has a higher risk of abnormal vibrations such as rolling and swaying as compared with a speaker unit with a damper.

Therefore, providing a rib (groove portion) to the edge is considered. The rib exhibits an effect of increasing bending strength in a direction in which the groove extends, and reducing the bending strength in a direction crossing the groove. This has the effect of making it easier for the diaphragm to move back and forth while reducing lateral sway and rolling. On the other hand, in this rib, when moving the diaphragm back and forth, the reaction force generated differs between when the diaphragm is displaced forward and when the diaphragm is displaced backward by the same displacement amount, that is, the displacement amount differs between the forward displacement and the backward displacement when the same force is input, which can cause distortion in the reproduced sound. In addition, the linearity of the relationship between the displacement amount and the reaction force is not sufficient. This can also cause distortion of the reproduced sound. This problem is more pronounced at large amplitudes.

Some headphones also open up part or most of the housing, and open up the space from the front of the speaker unit to the user. Many users prefer such open-type headphones because they allow them to hear outside sound at the same time. Compared to sealed or semi-sealed headphones, open-type headphones cause a drop in sound pressure in a low-frequency range. If the amplitude is increased to prevent this drop in sound pressure, the asymmetry and non-linearity described above can become pronounced. With the above points in mind, the details of the present disclosure will be explained using the embodiments below.

One Embodiment

Example of Overall Configuration of Headphone

In the present embodiment, a headphone is used as an example of an acoustic processing device. The present disclosure is also applicable to other acoustic processing devices, such as earphones, hearing aids, stationary speaker devices, and the like.

Example of Configuration of Headphone

Example of Overall Configuration

Figure 3:
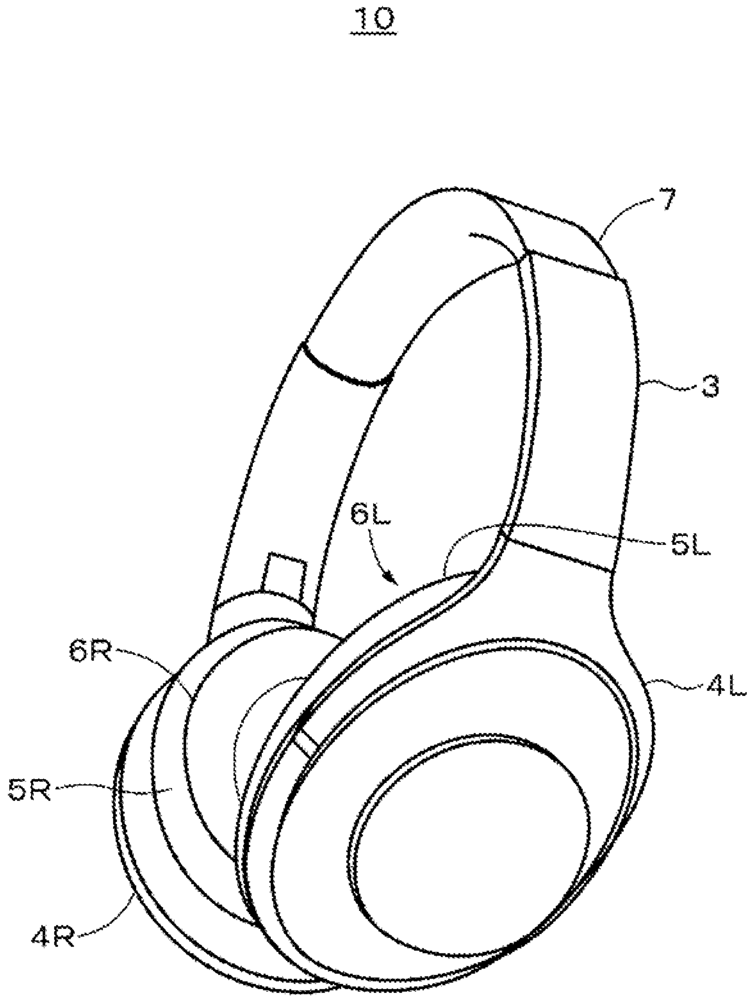
FIG. 3 is a diagram for explaining an example of a configuration of a headphone according to an embodiment.
Figure 4:
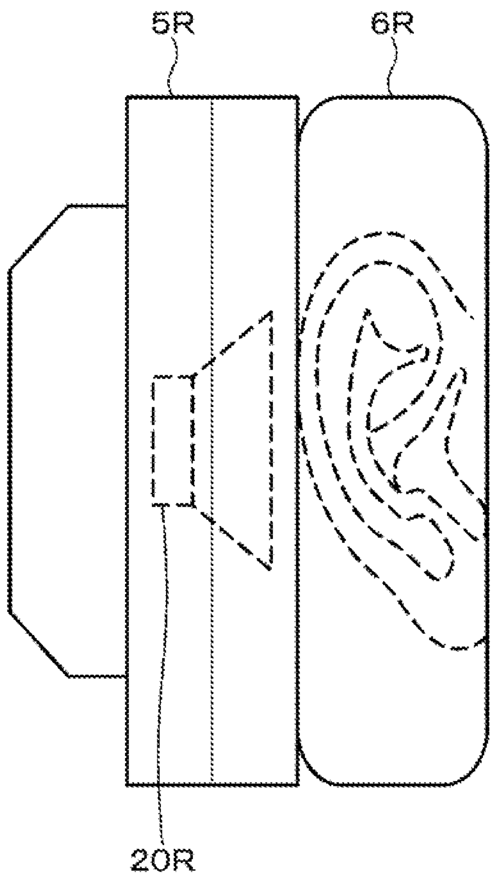
FIG. 4 is a diagram for explaining an example of a configuration of a headphone according to an embodiment.

With reference to FIGS. 3 and 4, the headphone (headphone 10) of the present embodiment will be described. FIG. 3 is a diagram (perspective view) for explaining an external configuration of the headphone 10. FIG. 4 is a partial view of the headphone 10 worn by a user.

As shown in FIG. 3, the headphone 10 has, for example, a slider 3, hangers 4L, 4R, housings 5L, 5R, ear pads 6L, 6R, and a headband 7. As shown in FIG. 4, for example, a driver unit 20R is provided inside the housing 5R. Also, although not shown in the diagram, a driver unit having the same configuration as the driver unit 20R is also provided inside the housing 5L.

The slider 3 is provided at both ends of the headband 7. A hanger (hanger 4L or 4R) is attached to a joint at one end portion of the slider 3. The slider 3 is configured to be slidable along a guide member (not shown) that is fixed to the both ends of the headband 7 and has an axis that coincides with the central axis of the headband 7. By sliding the slider 3 along the guide member, the hangers 4L, 4R can be moved away from or closer to the headband 7. When wearing the headphone 10, the position of the slider 3 is adjusted according to the size of the head of the user (wearer) and the distance between the ear and the top of the head. This allows the user of the headphone 10 to obtain a wearing comfort according to his/her own physical characteristics and preferences. On the other hand, when the headphone 10 is not in use, the slider 3 can be retracted to save storage space.

The hangers 4L, 4R are provided at tips of the slider 3, with a joint portion (not shown) therebetween, and are configured to rotatably support the housings 5L, 5R.

The housings 5L, 5R have an internal storage space and contain a driver unit and the like that convert an electrical signal into a sound wave and output it. The housings 5L, 5R are formed, for example, using synthetic resin such as plastic. The housings 5L, 5R have the effect of inhibiting air from entering and leaving the front and rear sides of the speaker diaphragm, and by sealing or semi-sealing the space from the front of the speaker diaphragm to the eardrum of the user with a housing having acoustic resistance, ducts, and the like, the acoustic radiation from the front of the diaphragm can efficiently be transmitted to the eardrum of the user.

The ear pads 6L, 6R are provided on the sides of the housings 5L, 5R facing the side of the user's head. The ear pads 6L, 6R are interposed between the housings 5L, 5R and the side of the user's head to serve as cushioning members between the housings 5L, 5R and the side of the user's head. In other words, the ear pads 6L, 6R prevent the housings 5L, 5R, which are made of hard material that is not easily deformed, from directly contacting the user's ears and the side of the user's head, causing discomfort and pain to the user when the headphone 10 is worn. The ear pads 6L, 6R have a configuration of sponge or other material covered with synthetic leather or cloth.

As shown in FIG. 3, the headband 7 is formed so as to curve along the head of the user, and is configured to support the entire headphone 10 by coming into contact with the top of the user's head wearing the headphone 10. The headband 7 is made of a synthetic resin such as plastic, metal, or the like, and is flexible by having predetermined rigidity and elasticity. It should be noted that a rubber or the like may be provided as a cushioning material on a part of an inner surface of the headband 7 that comes into contact with the top of the head of the user. Moreover, a hinge may be provided so that the headphone 10 can be folded at the center thereof when the headphone 10 is carried.

Example of Configuration of Driver Unit

Figure 5A:
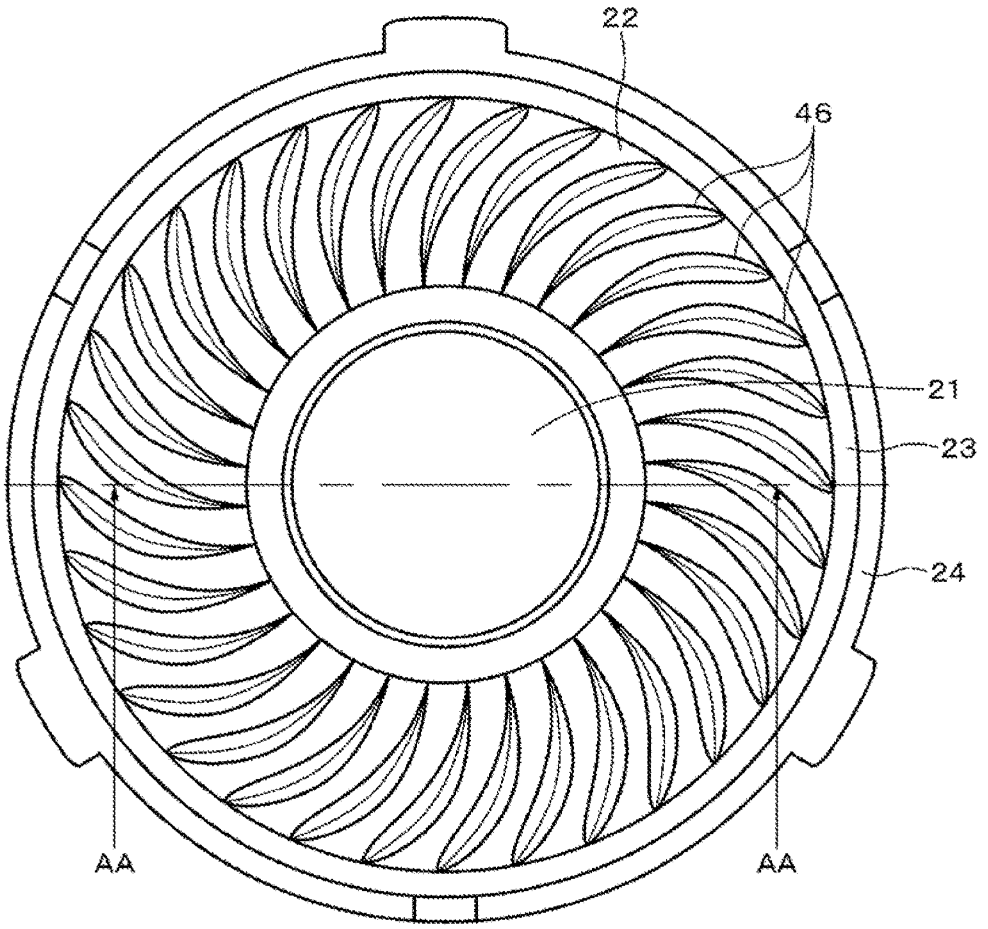
FIGS. 5A and 5B are diagrams for explaining an example of a configuration of a speaker unit according to an embodiment.
Figure 5B:
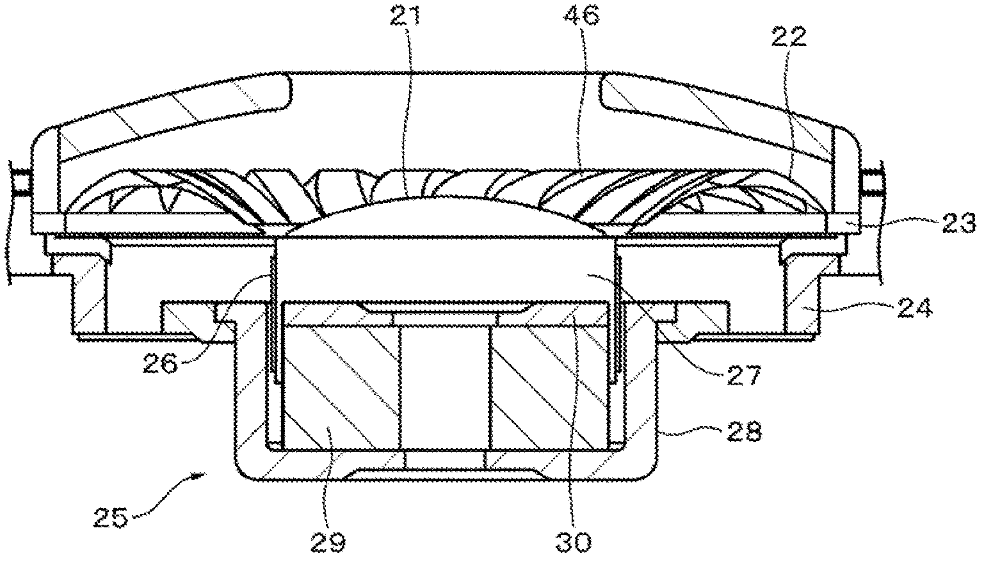

Next, with reference to FIGS. 5A and 5B, an example of a configuration of the driver unit 20R according to the present embodiment will be described. FIG. 5A is a front view of the driver unit 20R viewed from a sound radiation direction side (front side in the direction toward the drawing), and FIG. 5B is a cross-sectional view taken when the driver unit 20R is cut at the cut line AA-AA of FIG. 5A. In the following, the driver unit 20R housed in the housing 5R is described, but the same configuration applies to the driver unit housed in the housing 5L.

The driver unit 20R according to the present embodiment is, for example, a damper-less electrodynamic speaker unit. The driver unit 20R includes, for example, a diaphragm 21, an edge 22, a diaphragm ring 23, a frame 24, and a magnetic circuit 25. The magnetic circuit 25 includes, for example, a voice coil 26, a bobbin 27, a yoke 28, a magnet 29, and a pole piece 30.

As shown in FIG. 5A, the edge 22 and the diaphragm ring 23 are arranged around the diaphragm 21. The diaphragm 21 is connected to the diaphragm ring 23 via the edge 22. The diaphragm ring 23 is firmly fixed to the frame 24.

The diaphragm 21 has an abbreviated circular shape in frontal view and a dome shape in cross-sectional view. The diaphragm 21 can be made of rubber, fiber textile materials such as paper and carbon fiber, metals such as aluminum and magnesium alloys, thermoplastic polyurethane elastomer (TPU), polyethylene terephthalate (PET), liquid crystal polymer film (LCP), or the like. The thickness of the diaphragm 21 is, for example, approximately 30 to 50 (μm).

The edge 22 has an abbreviated semicircular shape when viewed in cross-section. Thermoplastic polyurethane elastomer (TPU), polyethylene terephthalate (PET), liquid crystal polymer film (LCP), or the like can be applied as the edge 22. The edge 22 and the diaphragm 21 can be made of the same material (e.g., the same resin material) or different materials. Ribs 46 are formed on the edge 22. Details of the ribs 46 are described below.

The diaphragm ring 23 and the frame 24 are made of resin, metal or the like. The diaphragm ring 23 is used for the purpose of holding the shape of the diaphragm 21 and the edge 22 when the diaphragm 21 and the edge 22 are molded. Depending on the material and thickness of the edge 22, the configuration pertaining to the diaphragm ring 23 may be omitted, or the edge 22 may be fixed directly to the frame 24.

The magnetic circuit 25 vibrates the diaphragm 21 in the vertical direction in FIG. 5B by applying a force to the diaphragm 21 in response to a drive signal. The vibration of the diaphragm 21 radiates sound from the opposite side of the magnetic circuit 25 to the diaphragm 21, and the radiated sound is heard by the user. The magnetic circuit 25 is firmly fixed to the frame 24. For the purpose of protecting the diaphragm 21 from contact by the user or worker during product assembly, a protector may be provided on the opposite side of the frame 24 to the diaphragm 21 and fixed to the frame 24.

The voice coil 26 is connected to the diaphragm 21 using an adhesive or a double-sided tape. The voice coil 26 vibrates in the vertical direction in FIG. 5B in response to a drive signal. The vibration of the voice coil 26 is transmitted to the diaphragm 21, causing the diaphragm 21 to vibrate. The sound corresponding to a voice signal is reproduced as the diaphragm 21 vibrates. The voice coil 26 is wound around the bobbin 27.

The yoke 28 is formed of, for example, a magnetic material. One end face of the ring-shaped magnet 29 is fixed on a flange portion of the yoke 28. A pole piece 30 in the other end face ring shape (ring plate shape) of the magnet 29 is overlapped. The voice coil 26 is placed in the gap between the yoke 28 and the pole piece 30.

Example of Configuration of Edge

Example of Overall Configuration

Figure 6:
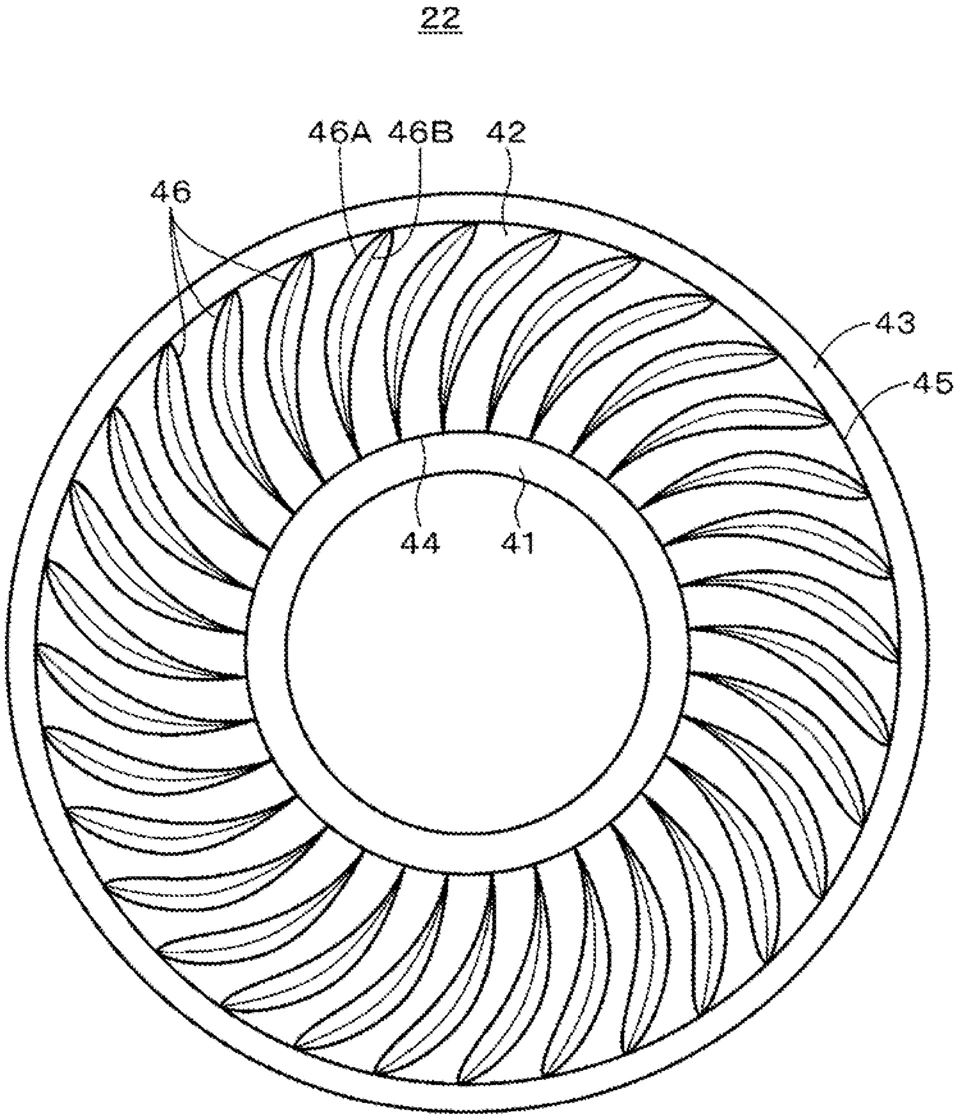
FIG. 6 is a diagram for explaining an example of a configuration of an edge according to an embodiment.

Next, an example of the edge 22 will be described with reference to FIGS. 6, 7A, 7B, 8, 9, and 10. FIG. 6 is a front view of the edge 22 viewed from the sound radiation direction. The edge 22 has a ring shape as a whole in the front view. The edge 22 has a configuration in which an inner flat portion 41, an edge-shaped portion 42, and an outer flat portion 43 are continuously formed from the inside. The edge 22 also has an inner peripheral portion 44 and an outer peripheral portion 45. Each of these configurations is made of the same material, but may be made of different materials.

The inner flat portion 41 functions as a mounting portion used when, for example, the diaphragm 21, bobbin 27, and the like are mounted. The outer flat portion 43 functions as a mounting portion used when the edge 22 is mounted on the diaphragm ring 23 or other predetermined locations.

The edge-shaped portion 42 is a convex portion that is convex in at least one direction. The edge-shaped portion 42 according to the present embodiment is a convex portion that has an abbreviated semicircular cross-sectional shape and is convex in one direction toward the sound radiation direction. The edge-shaped portion 42 may be convex in both the sound radiation direction and the opposite direction, or may be shaped such that the direction of convexity changes from the middle. The inner peripheral portion 44 is a boundary portion between the inner flat portion 41 and the edge-shaped portion 42, and the outer peripheral portion 45 is a boundary portion between the outer flat portion 43 and the edge-shaped portion 42.

The edge-shaped portion 42 has the ribs 46 that are concave on the opposite side of the sound radiation direction as an example of groove portions. A plurality of ribs 46 are formed at equal intervals with respect to the edge-shaped portion 42. The concave-convex shape of the edge 22 formed by the ribs 46 is also referred to as corrugation or the like. The ribs 46 are formed together with the edge-shaped portion 42 and other portions using, for example, a mold. Note that in FIG. 6, reference signs are given only to some of the ribs 46.

A rib 46 has a peak portion 46A and a valley portion 46B. Here, the peak portion 46A means the shallowest part (the part on the closest side of the page in FIG. 6) in the rib 46. The valley portion 46B means the deepest part (the part on the farthest side of the page in FIG. 6) in the rib 46. The rib 46 operates to follow the displacement of the diaphragm 21 and the expansion and contraction of the edge 22. Specifically, when the diaphragm 21 is displaced forward, the ribs 46 operate to open, and when the diaphragm 21 is displaced backward, the ribs 46 operate to close.

The line formed by the valley portion 46B (hereinafter referred to as the ridge line of the valley portion 46B) extends from a predetermined part on the inner peripheral portion 44 side (hereinafter referred to as the start point) to a predetermined part on the outer peripheral portion 45 side (hereinafter referred to as the end point) so as to form a continuously varying curve. The start point and the end point are used for convenience of description, and the manufacturing method and the like of the edge 22 are not limited by this description. The number of start points, the number of end points, and the patterns of arrangement positions thereof may be set as appropriate. In the present embodiment, the start point is set on the inner peripheral portion 44 and the end point is set on the outer peripheral portion 45.

Cross-Sectional Shape of Ribs

Figure 7A:
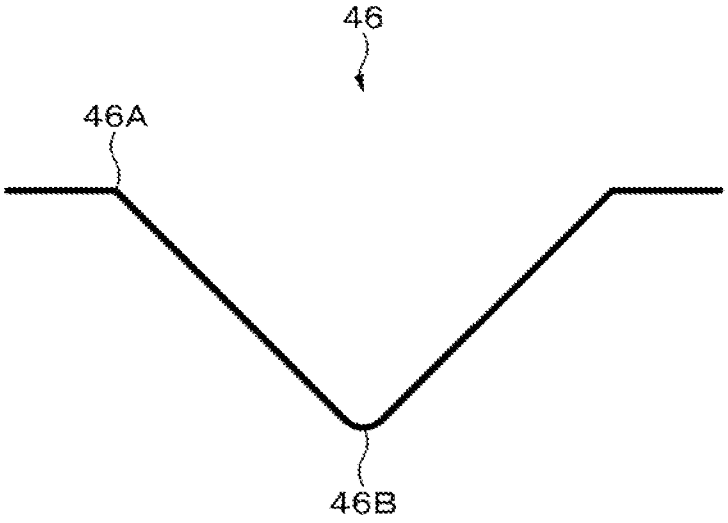
FIGS. 7A and 7B are diagrams for explaining an example of a cross-sectional shape of a rib according to an embodiment.
Figure 7B:
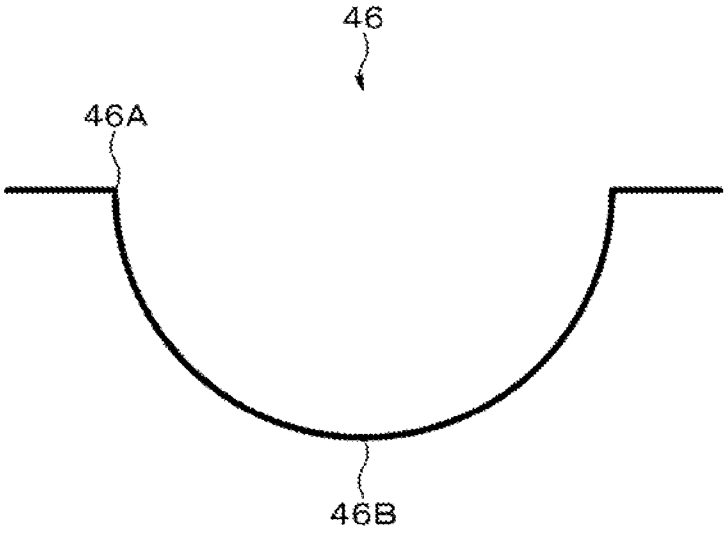

The cross-sectional shape of a rib 46 may be, for example, a V-shape as shown in FIG. 7A, an arc-shape as shown in FIG. 7B, other shapes (rectangular, U-shaped, or the like), or a combination thereof.

About the Curve

Figure 8:
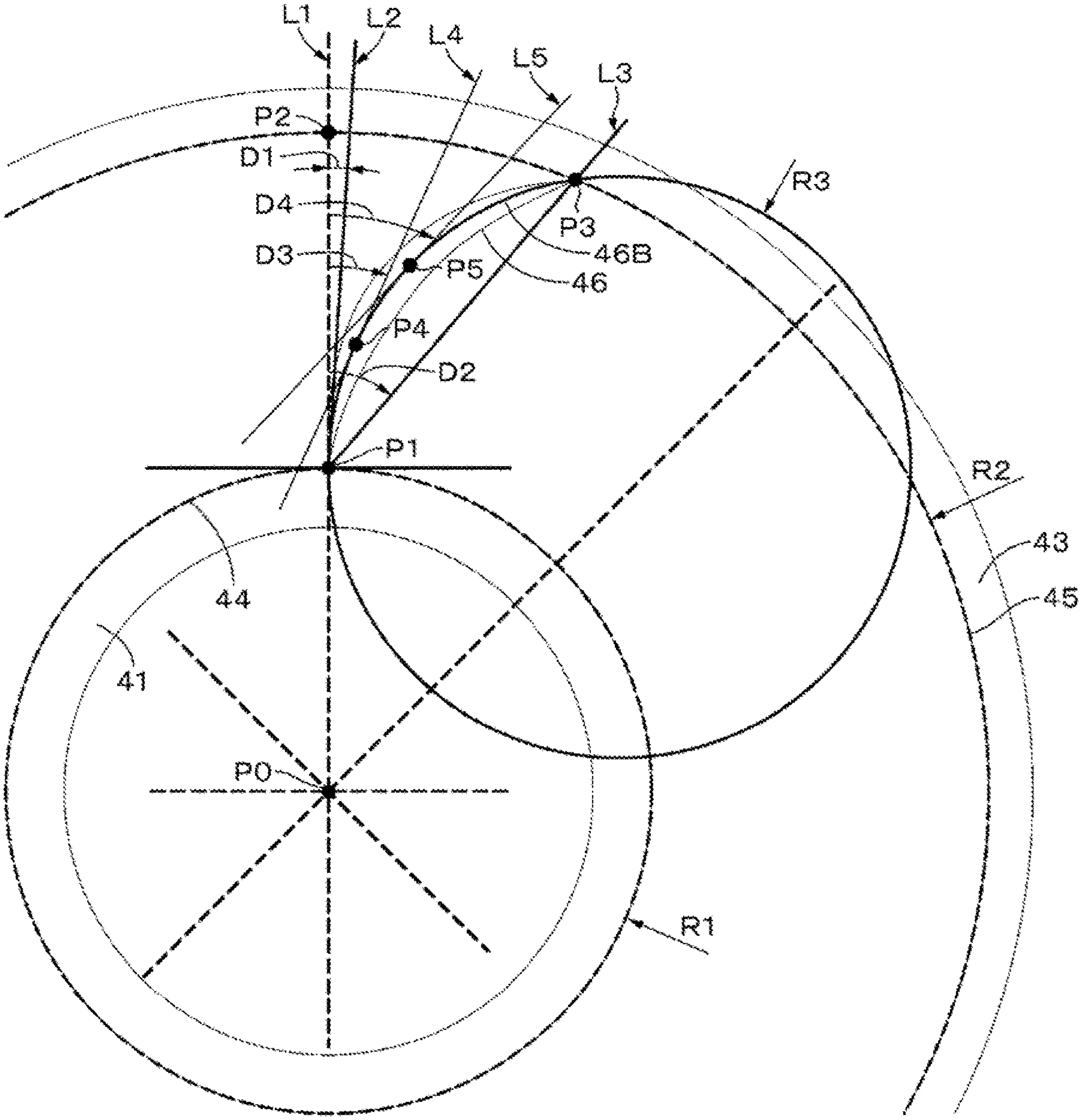
FIG. 8 is a diagram for explaining an example of a curve drawn by a ridge line of a valley portion according to an embodiment.

Next, the curve drawn by the ridge line of the valley portion 46B will be explained with reference to the partially enlarged view shown in FIG. 8. In FIG. 8, the ribs 46 and the like are illustrated to the extent necessary for explanation in order to prevent the illustration from becoming cumbersome.

FIG. 8 shows each of the following:

P0: Center point (center) of diaphragm ring 23 or edge 22

R1: Radius of inner peripheral portion 44

P1: Start point of ridge line of valley portion 46B

R2: Radius of outer peripheral portion 45

P2: Any repeated pattern point on R2

P3: End point of ridge line of valley portion 46B

L1: Straight line passing through P0 and P2 (normal to R1 and R2)

L2: Straight line passing through P1

R3: Circular arc P1P3 tangent to L2 at P1 and passing through P3

D1: Angle formed by L1 and L2 (0°≤D1≤30°)

L3: Straight line passing through P1 and P3

D2: Angle formed by L1 and L3 (D1<D2<90°)

Specifically, the curve drawn by the ridge line of the valley portion 46B is defined as follows. First, the start point P1, which is the point of intersection between the normal L1 to the center of the edge 22 and the inner peripheral portion 44, is set. In the present specification, the normal L1 is not limited to a normal in the strict sense of the word, but includes a line that is inclined from the normal to a certain degree (e.g., within a range of 30°). In other words, L2 is also included in the normal in the present specification.

A curve passing through the start point P1 is set, and the point of intersection between the curve and the outer peripheral portion 45 is set as the end point P3. The curve P1P3 passing through the start point P1 and the end point P3 satisfies the following conditions. The part of the curve P1P3 that is away from the start point P1 is taken as P4 (an example of the first part), and the angle formed by the normal L1 (or L2) and the tangent line L4 at P4 with respect to the curve P1P3 is taken as the angle D3 (the first angle). The part of the curve P1P3 that is further away from the start point P1 than P4 is taken as P5 (an example of a second part), and the angle formed by the normal L1 (or L2) and the tangent line L5 at P5 with respect to the curve P1P3 is taken as D4 (the second angle). In this case, the curve P1P3 is a curve that satisfies D3 (the first angle)≤D4 (the second angle), and the end point P3 is also set to satisfy the conditions.

If the curve P1P3 is a curve that satisfies the above conditions, the curve P1P3 may be a part of a circular arc, or may be another curve such as a spline curve, a sine curve, a clothoid curve, or a combination of these curves. The curve P1P3 may also be a curve for which the angle of the tangent to the curve P1P3 at a given part is 45° or less with respect to the normal L1, in, for example, a portion of the total length that is 10% or less of the inner peripheral portion 44.

About the Depth of the Valley Portion

Figure 9:
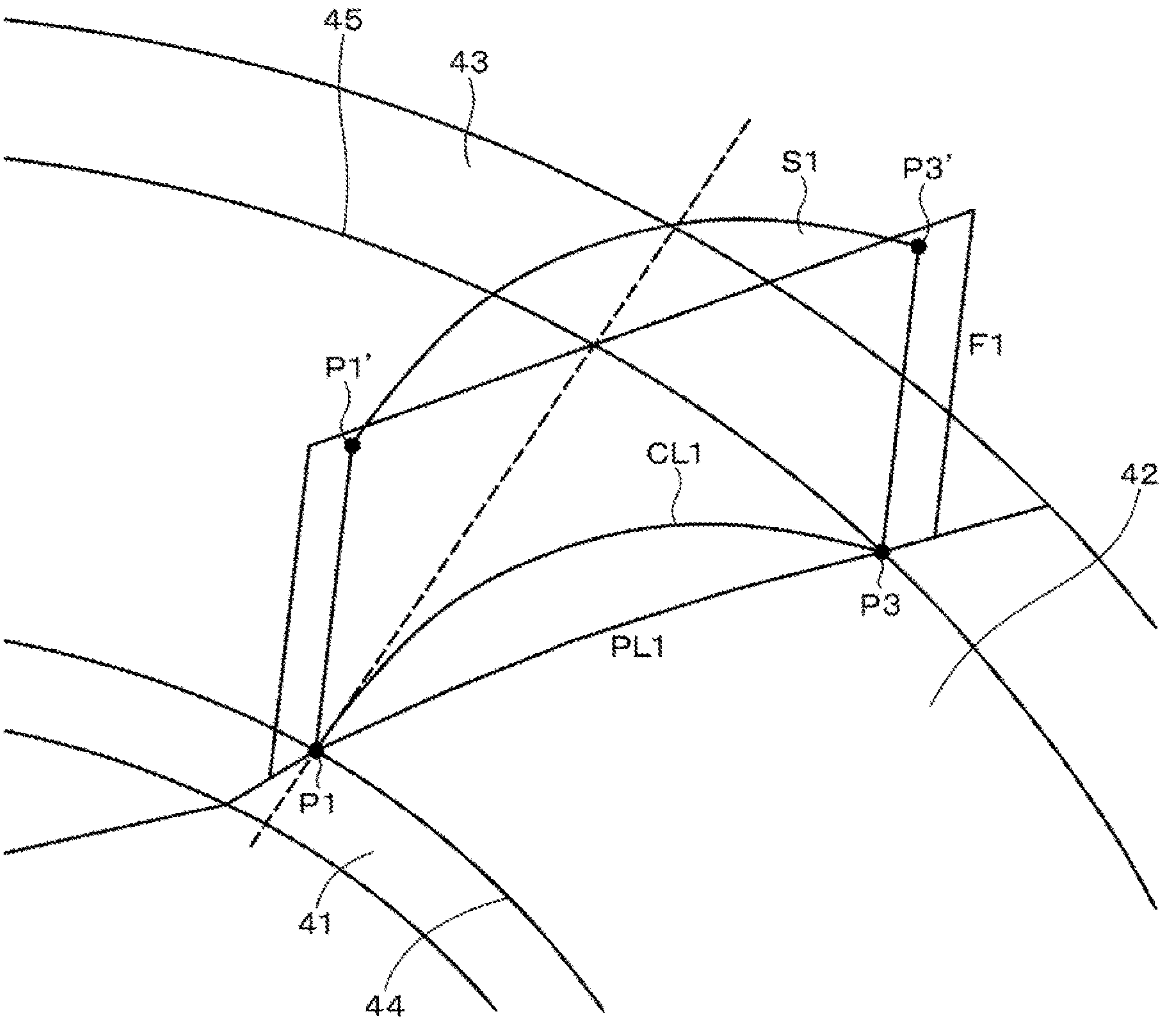
FIG. 9 is a diagram for explaining a depth relationship between a peak portion and a valley portion.

Next, an example of setting the depth of the valley portion 46B will be described with reference to FIGS. 9 and 10. FIG. 9 is a partially enlarged view of the edge 22. In FIG. 9, a curved surface where the curve P1P3 is extruded in the depth direction in the front view is taken as a curved surface S1. The vertices at ends different from P1 and P3 on the curved surface S1 are taken as P1' and P3'. In this case, P1-P1' and P3-P3' are set at positions that traverse the edge-shaped portion 42 before the ribs 46 are set. The intersection curve of the curved surface S1 with the edge-shaped portion 42 curved surface is defined as CL1, and a projected curve of CL1 onto a plane F1 consisting of P1P1'P3P3' is defined as PL1. Such PL1 corresponds to the ridge line of the peak portion 46A.

Figure 10:
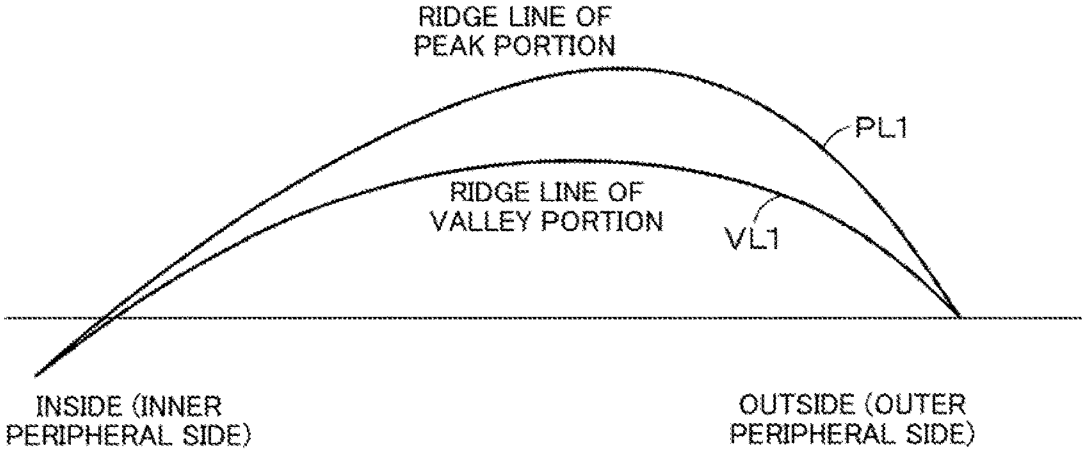
FIG. 10 is a diagram for explaining the depth relationship between the peak portion and the valley portion.

As shown in FIG. 10, VL1, which is set lower with respect to PL1, is drawn on the plane F1, and this is the ridge line of the valley portion 46B in the depth direction. VL1 may be a part of a circular arc, a spline curve, a sine curve, a clothoid curve, or a combination thereof. If VL1 is a curve, the distance between the ridge line of the peak portion 46A and the ridge line of the valley portion 46B (the gap between PL1 and VL1; the larger this gap, the deeper the edge 22) varies continuously as shown in FIG. 10. In addition, the valley portion 46B is not more convex than the peak portion 46A. The three-dimensional ridge line of the valley portion 46B is a curve with VL1 projected onto the curved surface S1.

Figure 11:
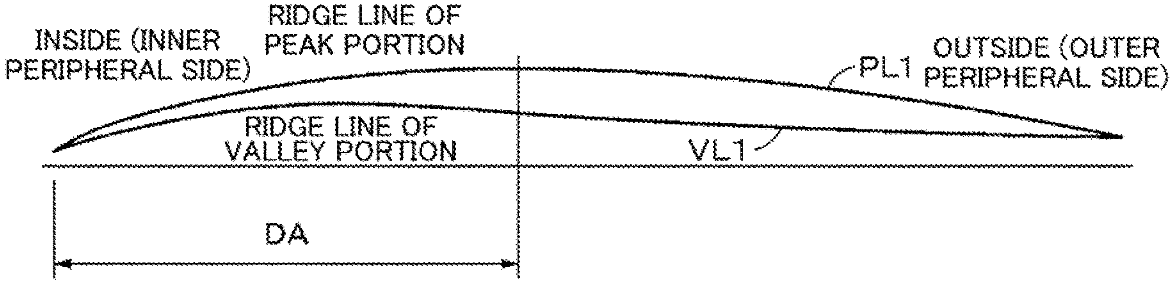
FIG. 11 is a diagram for explaining a specific example of the depth relationship between the peak portion and the valley portion.

FIG. 11 shows an example of VL1 drawn as a spline curve. When VL1 is drawn as a spline curve, the depth of the valley portion 46B becomes shallower on the inside and deeper toward the outside, eventually matching VL1 and PL1, as shown in FIG. 11. More specifically, the depth increases from the start point of rib 46 to a predetermined part between the start point and the end point, and decreases from the predetermined part to the end point. The predetermined part is, for example, the part at the distance DA from the start point, where the depth is maximum, as shown in FIG. 11. By deepening the outer side, it is possible to create an edge with high amplitude-reaction force symmetry (linearity) and a diaphragm to which such edge is applied.

Advantageous Effects

According to the present embodiment, for example, the following effects can be obtained.

As described above, the edge 22 of the present embodiment has ribs that make the inside of the edge 22 normal or near normal to the inner peripheral portion 44. As a result, the inner circumferential extension of the edge 22 when the diaphragm 21 is displaced forward is made easier to displace as compared to the conventional corrugated shape that is closer to the tangent line of the inner peripheral edge. On the other hand, when ribs 46 are completely normal, there are issues with resistance to rolling, lateral sway, or the like. With the conventional straight rib shape, when adjusting the characteristics of forward displacement and backward displacement, the angle and depth to the tangent line are adjusted, and as a result, both characteristics are affected and one of them may be sacrificed. However, in the present embodiment, by expressing the ridge line of a rib 46 (specifically, the valley portion 46B) as a curve in the front view and a curve in the depth direction, the characteristics of forward displacement and the characteristics of backward displacement can be adjusted with the other characteristics being reduced, thereby improving the overall characteristics.

In addition, because of the shape in which a single rib 46 connects from the inside to the outside, the ratio of the area in which the rib 46 is formed to the area of the edge can be made larger than in those with ribs in a plurality of shapes (e.g., ribs in a plurality of shapes as described in PTL 2). In the case of headphones and earphones, relatively small-diameter speaker units are often used, and there is no room in terms of area to provide ribs having a plurality of shapes. However, since the shapes of the plurality of ribs are basically identical in the present embodiment, the present invention is applicable even when a speaker unit with small elasticity and a small diameter, such as headphones and earphones, is used. Thus, by making the curve with a different angle with respect to the inner peripheral portion 44 on the inner side and the outer side, the shape can be made into an optimized operation shape with respect to the expansion and contraction of the edge 22, and the asymmetry and linearity of the reaction force on the back and forth amplitude of the diaphragm 21 can be further improved.

Figure 12:
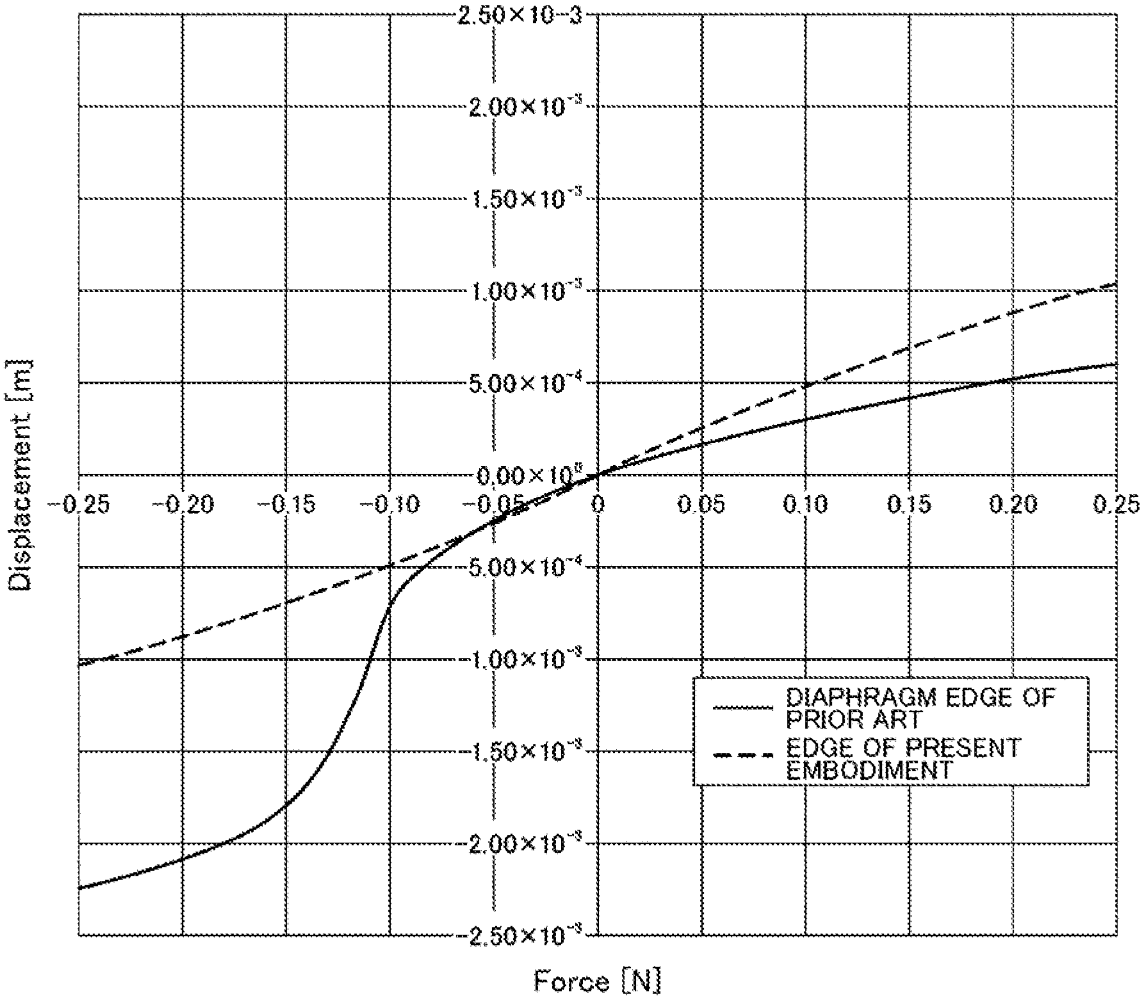
FIG. 12 is a diagram for explaining an example of an effect achieved by the present embodiment.

FIG. 12 is a graph showing the relationship between the amplitude of the diaphragm and the reaction force, contrasting the results of the simulation with the edge of prior art (technology of forming straight ribs on the edge)(shown in solid line) with the results of the simulation with the edge of the present embodiment (shown in a dotted line). As shown in this graph, the symmetry and linearity of the amplitude and the reaction force are improved by the present disclosure, and this effect is more pronounced at large amplitudes compared to the prior art. As a result, a speaker unit with low distortion of reproduced sound can be provided, which is suitable for not only sealed but also open-type headphones. This effect is also effective for headphones that use recent signal processing such as noise cancellation and virtual surround sounds, and can exhibit the characteristics closer to the ideal speaker unit assumed during most signal processing. This can increase the effectiveness of signal processing and thus improve the sound quality and performance of an acoustic processing device.

Modification

Although embodiments of the present disclosure have been described above in detail, the present disclosure is not limited to the foregoing embodiments, and various modifications based on the technical spirit of the present disclosure can be made.

Figure 13A:
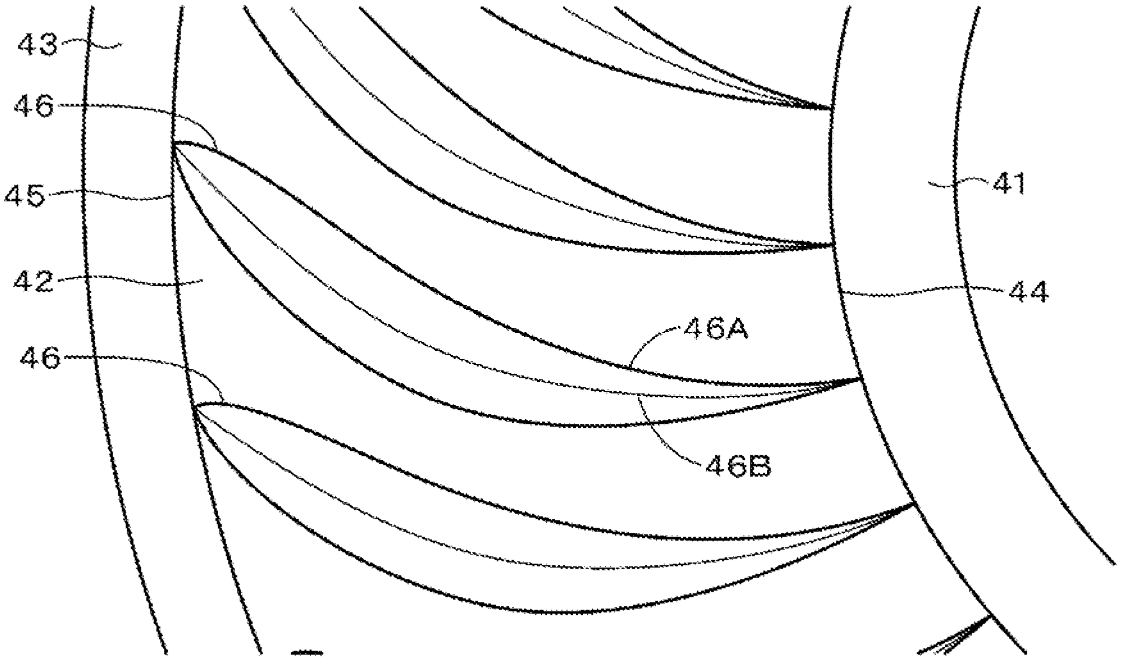
FIGS. 13A and 13B are diagrams for explaining a modification.
Figure 13B:
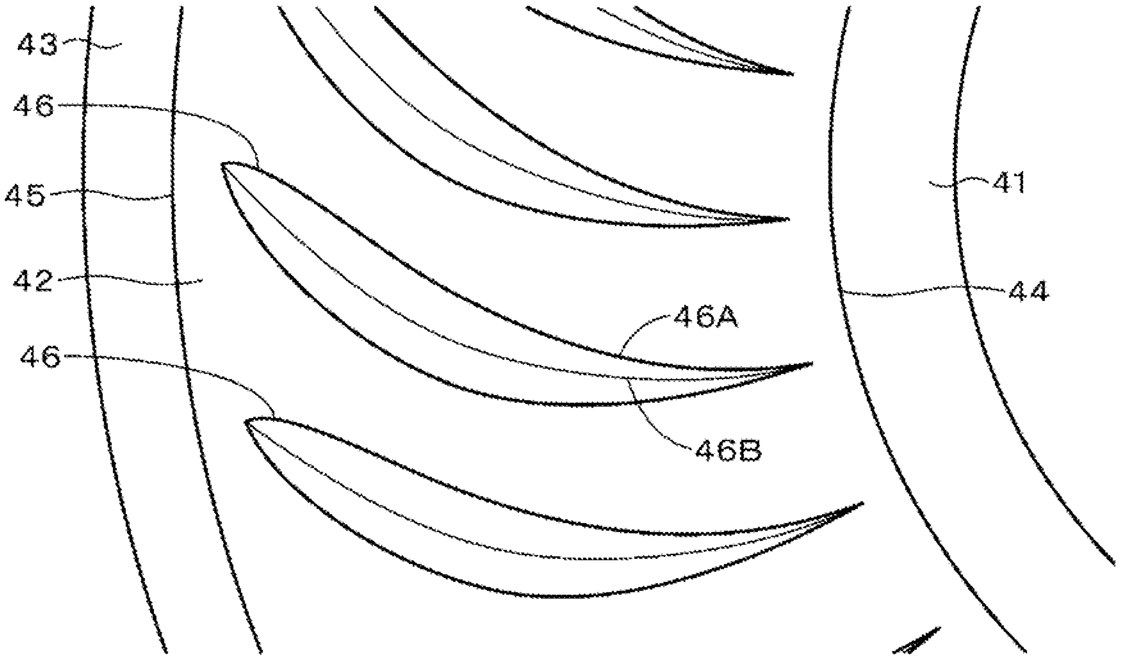

In one embodiment described above, as shown in FIG. 13A, the start point of a rib 46 was set on the inner peripheral portion 44 and the end point of the rib 46 was set on the outer peripheral portion 45, but the embodiment is not limited thereto. For example, as shown in FIG. 13B, the start point of the rib 46 may be provided at a position offset (slightly centered) from the center of the edge-shaped portion 42 relative to the inner peripheral portion 44, and the end point of the rib 46 may be provided at a position offset (slightly centered) from the center of edge-shaped portion 42 relative to the outer peripheral portion 45. In other words, the start point and the end point of a rib 46 may be set such that the length of the rib 46 in the present example is shorter than the length of the rib 46 in one embodiment.

If the start point of a rib 46 is set on the inner peripheral portion 44 and the end point of the rib 46 is set on the outer peripheral portion 45, depending on the number and shape of ribs 46, the stress caused by the operation of the ribs 46 may be concentrated at a predetermined part (near the start point and the end point of the ribs 46), and stress may be concentrated in the circumferential direction of the edge 22. This may cause abnormal vibration of the edge 22. However, the configuration shown in FIG. 13B can suppress this adverse effect.

Figure 14:
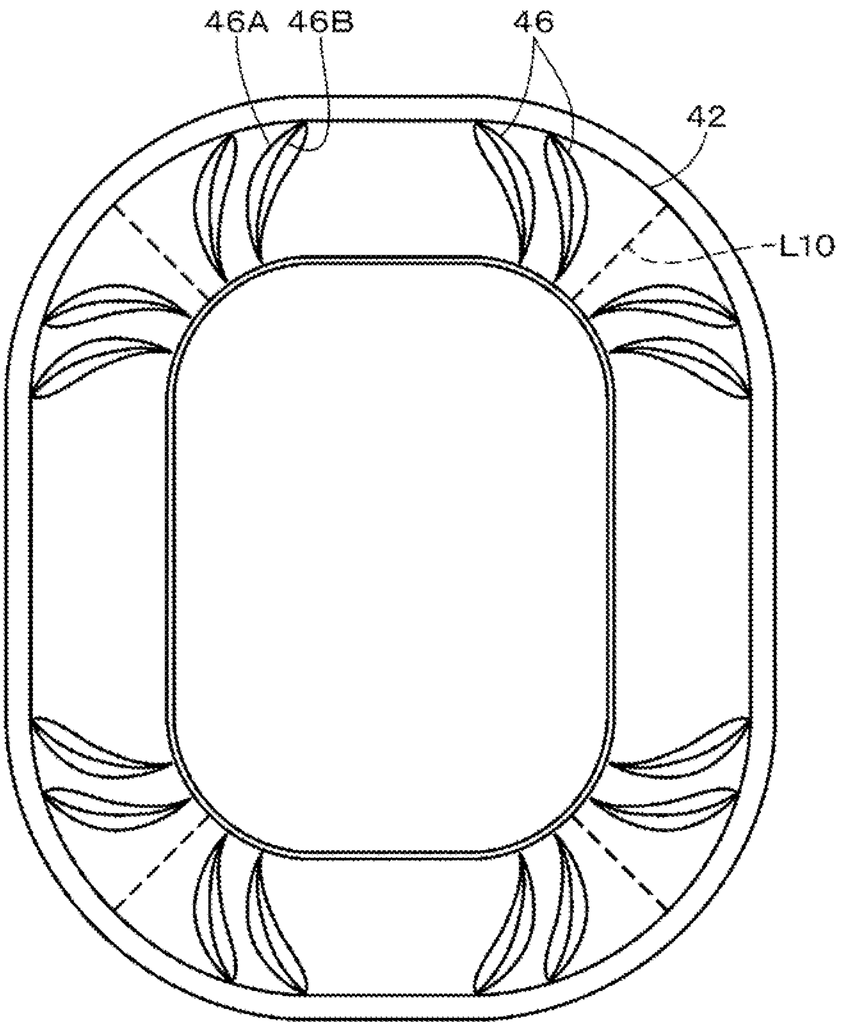
FIG. 14 is a diagram for explaining a modification.

The shape of the edge 22 is not limited to a ring shape, but can be, for example, a rectangular shape with a hole in the center, as shown in FIG. 14. In the example shown in FIG. 14, the edge-shaped portion 42 has four corners, each corner being virtually divided into two halves. Two paired ribs 46 are formed near each corner. The ridge lines of the valley portions 46B of one pair of ribs 46 (two ribs) and the ridge lines of the valley portions 46B of the other pair of ribs 46 (two ribs) are line symmetrical about a bisecting line L10, and draw curves that vary continuously with respect to different directions.

Figure 15:
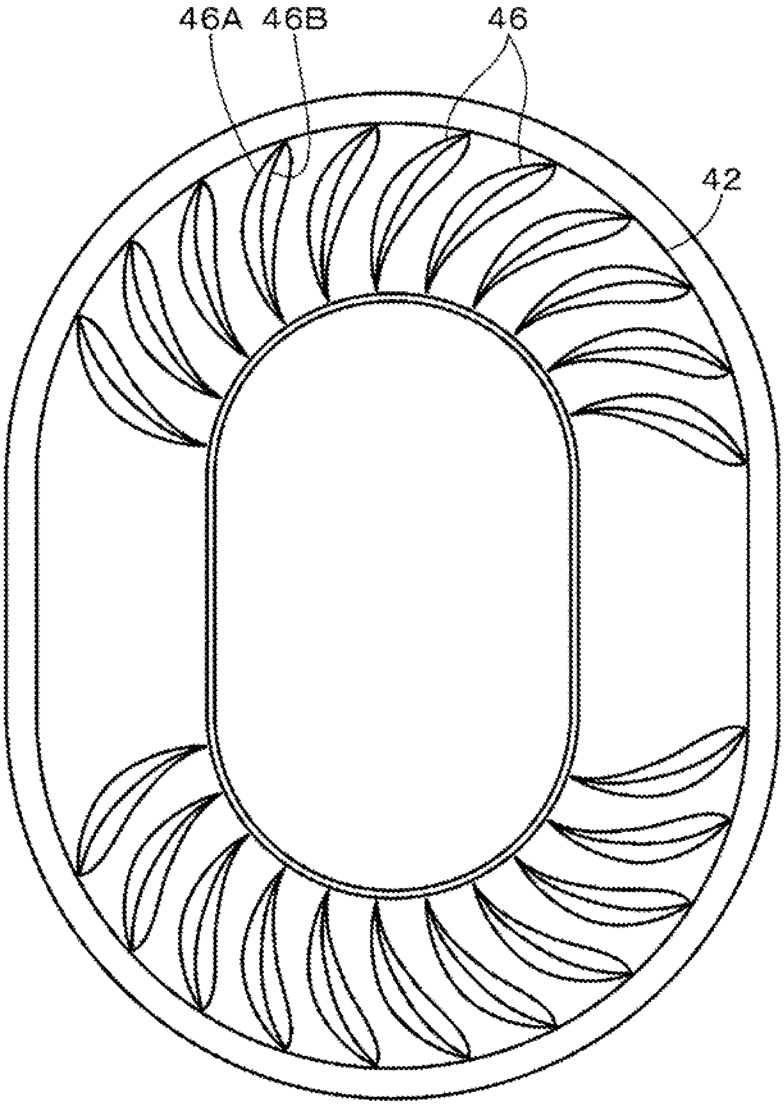
FIG. 15 is a diagram explaining a modification.

As shown in FIG. 15, the shape of the edge 22 may be of a small oval shape. In the edge 22 having such shape, for example, the ribs 46 are formed in a part with a curvature in the edge-shaped portion 42. In FIG. 15, since stress along a straight line does not occur in a part of the edge-shaped portion 42 that has no curvature (straight shape portion), there is no need to provide ribs 46 to optimize the linearity of the stress.

The present disclosure can be applied to the edge of a dampered speaker unit. The present disclosure is also applicable to the edge of a passive radiator that does not have a driving force in the vibration system. In addition, a plurality of groove portions may be formed at roughly equal intervals with respect to the edge-shaped portion, or may be formed with respect to the edge-shaped portion, but not at equal intervals.

Figure 16A:
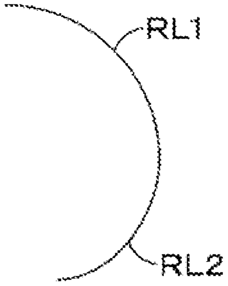
FIGS. 16A, 16B, 16C, and 16D are diagrams for explaining a modification.

The curve drawn by the ridge line of the valley portion 46B is not limited to a continuous curve composed of a single type, such as a part of a circular arc, a spline curve, a sine curve, or a clothoid curve, specifically a curve defined by a single curvature or a single expression. The curve drawn by the ridge line of the valley portion 46B may be, for example, a curve combining two types of curves RL1 and RL2, as shown in FIG. 16A. The curves RL1 and RL2 are, for example, a circular arc and a spline curve. The curve drawn by the ridge line of the valley portion 46B may be, for example, a curve combining three or more types of curves.

Figure 16B:
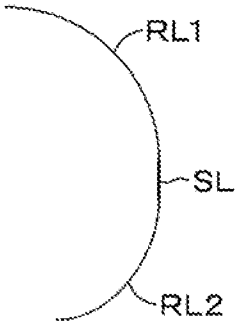
Figure 16C:
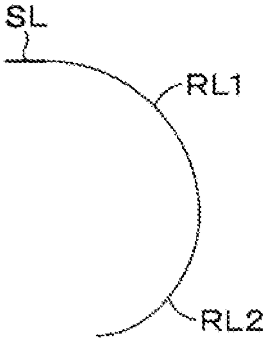
Figure 16D:
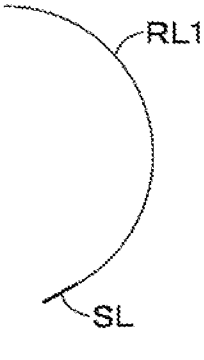

The curve drawn by the ridge line of the valley portion 46B may be a curve that partially includes a straight line (straight line of finite length) portion. In other words, the curves described in the present specification include curves that partially include a straight portion. A specific example of such a curve includes a curve that includes the two types of curves RL1 and RL2 and a straight line SL connecting the curves RL1 and RL2, as shown in FIG. 16B. The straight line SL can be a straight line extending not between the curves RL1 and RL2, but from an end portion (e.g., an end portion of the curve R1), as shown in FIG. 16C. Furthermore, the curve drawn by the ridge line of the valley portion 46B may be a curve that includes one type of curve RL1 and the straight line SL extending from an end portion of the curve RL1, or a curve combining three or more types of curves and straight lines, as shown in FIG. 16D.

Figure 17A:
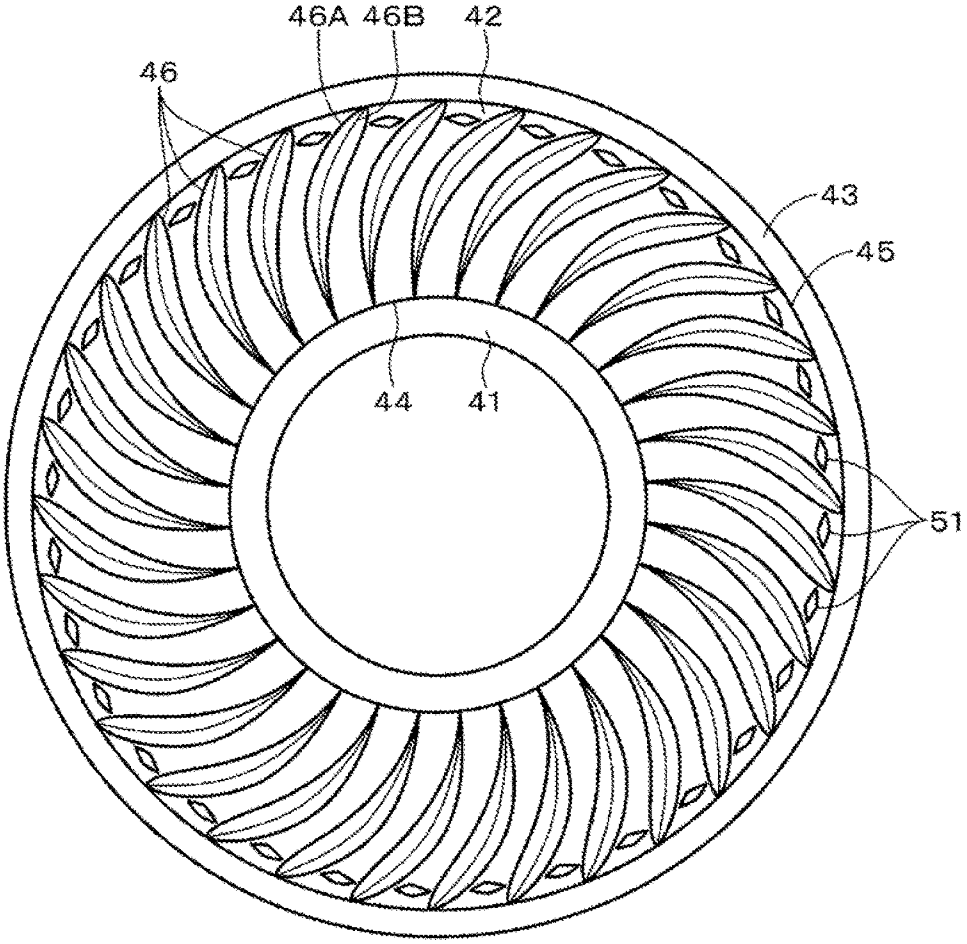
FIGS. 17A and 17B are diagrams for explaining a modification.
Figure 17B:
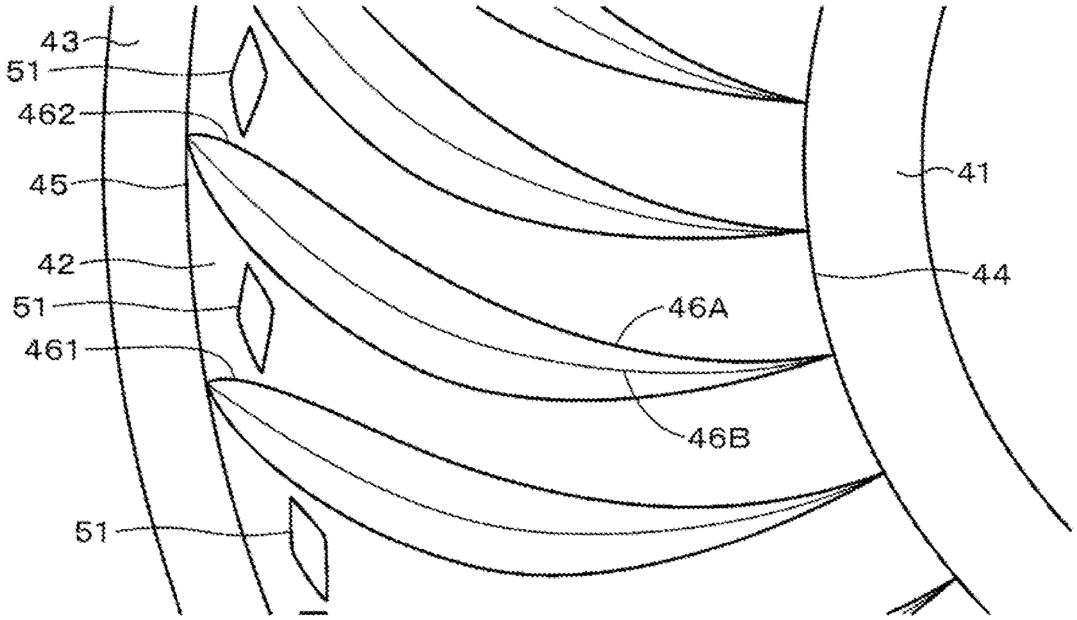

As shown in FIG. 17A, the edge 22 may include recess portions 51 provided between ribs 46. For example, as shown in FIG. 17B, the groove portions adjacent to each other are taken as ribs 461 (an example of a first groove portion) and 462 (an example of a second groove portion). A recess portion 51 is provided between the vicinity of the end point of a rib 461 and the vicinity of the end point of a rib 462.

Figure 18A:
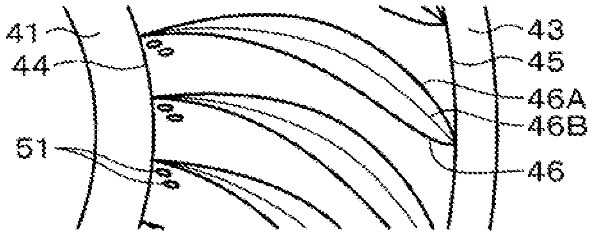
FIGS. 18A, 18B, 18C, 18D. 18E, and 18F are diagrams for explaining a modification.
Figure 18B:
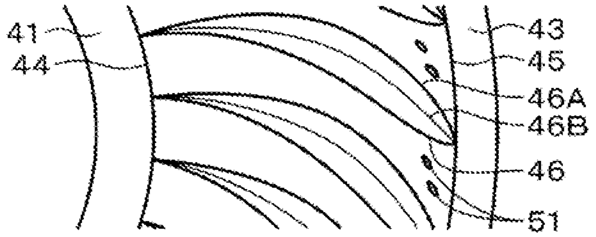
Figure 18C:
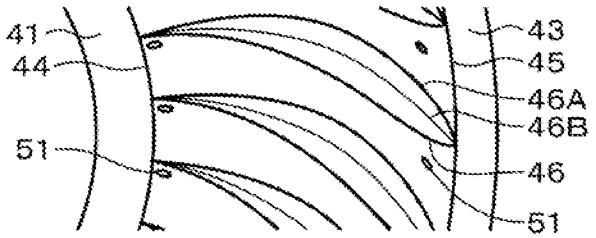
Figure 18D:
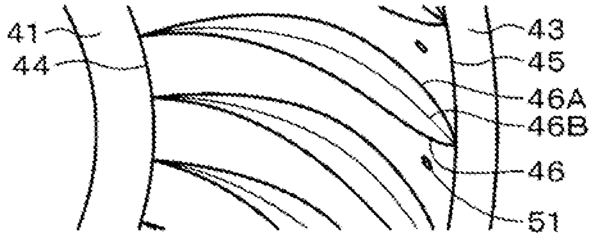
Figure 18E:
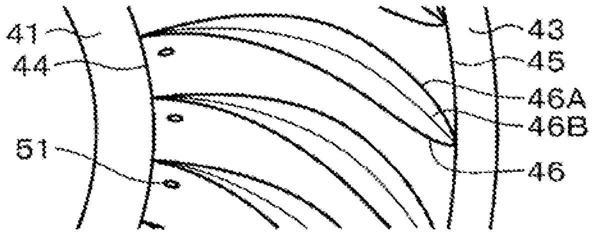
Figure 18F:

The recess portions 51 shown in FIG. 17B are, for example, smaller than the ribs 461 and 462 and have a shape that extends along the circumferential direction. The recess portions 51 are also provided between other ribs in the vicinity of the end points thereof. Needless to say, the location for forming a recess portion 51, the number of recess portions, and the shape of the recess portions 51 can be changed as needed. For example, as shown in FIG. 18A, two recess portions 51 may be provided between adjacent ribs 46 in the vicinity of the start points thereof. As shown in FIG. 18B, two recess portions 51 may be provided between adjacent ribs 46 in the vicinity of the end points thereof. As shown in FIG. 18C, one recess portion 51 may be provided between adjacent ribs 46 in the vicinity of the start points thereof and one recess portion 51 may be provided between adjacent ribs 46 in the vicinity of the end points thereof. As shown in FIG. 18D, one recess portion 51 may be provided between adjacent ribs 46 in the vicinity of the end points thereof. As shown in FIG. 18E, one recess portion 51 may be provided between adjacent ribs 46 in the vicinity of the start points thereof. As shown in FIG. 18F, a recess portion 51 may be provided between the groove portions shown in FIG. 13B (groove portions where the start points are set at positions offset from the inner peripheral portion 44 and the end points are set at positions offset from the outer peripheral portion 45) in the vicinity of the end points thereof. In the example shown in FIG. 18F, a recess portion 51 may be provided between adjacent ribs 46 in the vicinity of the start points thereof.

By providing the recess portions 51, stresses that may be locally concentrated at the inner peripheral portion 44 and the outer peripheral portion 45 can be alleviated. This can suppress the breakdown of amplitude-reaction force symmetry (linearity) due to local stress concentration. Note that the recess portion 51 may be a convex portion.

Figure 19:
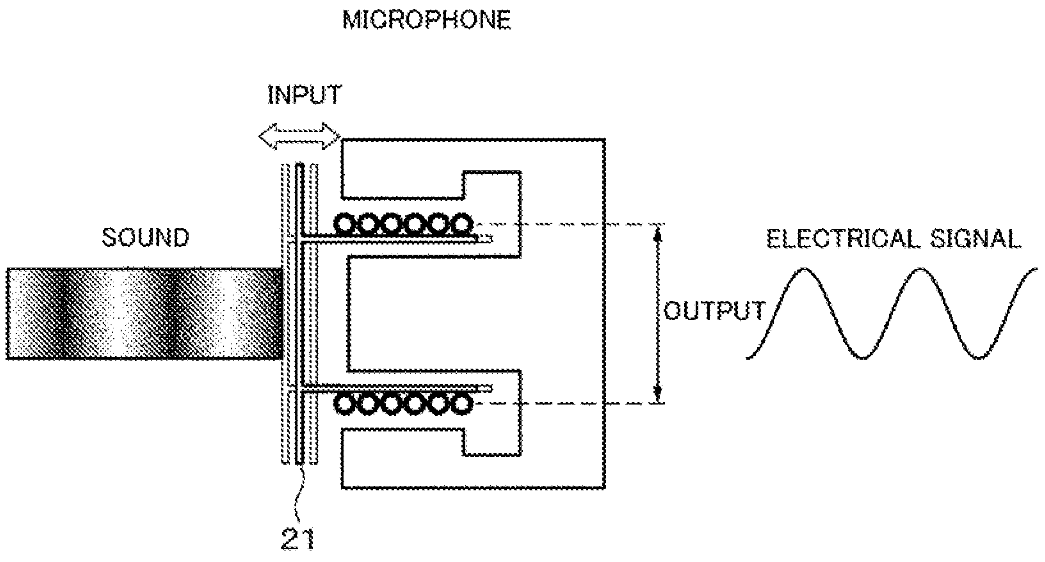
FIG. 19 is a diagram for explaining a microphone to which of the present disclosure can be applied.

The present disclosure is applicable not only to the edges of speaker units but also to microphones. FIG. 19 is a diagram schematically showing an electrokinetic microphone to which the present disclosure can be applied. An electrokinetic microphone is a device that converts sound into an electrical signal using the same principle as a speaker unit. As shown in FIG. 19, the displacement of the diaphragm 21 under sound pressure causes the coil to move in a magnetic field, generating an electric current (electrical signal). The present disclosure can be applied to the edge 22 that supports the diaphragm 21 in such a microphone. By applying the present disclosure, a microphone that generates distortion-free electrical signals can be realized. The present disclosure can also be configured as an acoustic processing device having such a microphone.

One or more of the foregoing embodiments and modifications may be arbitrarily selected and combined as appropriate. The configurations, methods, steps, shapes, materials, numerical values, and the like of the foregoing embodiments can be combined with each other without departing from the gist of the present disclosure.

The present disclosure can also be configured as follows.

(1) An edge, including:

an edge-shaped portion that is formed from an inner peripheral portion to an outer peripheral portion; and a groove portion that is formed in the edge-shaped portion and has a peak portion and a valley portion, wherein a ridge line of the valley portion of the groove portion extends from a start point on the inner peripheral portion side to an end point on the outer peripheral portion side so as to draw a continuously changing curve.

(2) The edge according to (1), wherein the start point is a point of intersection between a normal to a center of the edge and the inner peripheral portion.

(3) The edge according to (2), wherein when a part of the curve that is away from the start point is taken as a first part, and a first angle formed by the normal and a tangent of the first part to the curve is obtained, and when a part of the curve that is farther away from the start point than the first part is taken as a second part, and a second angle formed by the normal and a tangent of the second part to the curve is obtained, the curve satisfies (first angle)≤(second angle).

(4) The edge according to (3), wherein the curve is a circular arc, a spline curve, a sine curve, a clothoid curve, and a combination of these curves connecting the start point and the end point.

(5) The edge according to any one of (1) to (4), wherein a distance between a ridge line of the peak portion and the ridge line of the valley portion changes continuously.

(6) The edge according to (5), wherein the distance between the ridge line of the peak portion and the ridge line of the valley portion increases from the start point to a predetermined part between the start point and the end point, and decreases from the predetermined part to the end point.

(7) The edge according to any one of (1) to (6), wherein the edge-shaped portion is a convex portion protruding in at least one direction.

(8) The edge according to (7), wherein the edge-shaped portion is a convex portion protruding in one direction.

(9) The edge according to (8), further including an inner flat portion and an outer flat portion, wherein the inner peripheral portion is a boundary portion between the convex portion and the inner flat portion, and the outer peripheral portion is a boundary portion between the convex portion and the outer flat portion.

(10) The edge according to any one of (1) to (9), wherein the start point is provided at a position offset from a center of the edge-shaped portion relative to the inner peripheral portion, and the end point is provided at a position offset from the center of the edge-shaped portion relative to the outer peripheral portion.

(11) The edge according to any one of (1) to (10), wherein a plurality of the groove portions are formed at approximately equal intervals with respect to the edge-shaped portion.

(12) The edge according to any one of (1) to (11), wherein the groove portion includes a first groove portion and a second groove portion adjacent to the first groove portion, and a convex portion or a concave portion that is smaller than the first groove portion and the second groove portion is formed at least either between a part near a start point of the first groove portion and a part near a start point of the second groove portion in the edge-shaped portion, or between a part near an end point of the first groove portion and a part near an end point of the second groove portion in the edge-shaped portion.

(13) The edge according to any one of (1) to (12), wherein the curve includes at least two different curves.

(14) The edge according to any one of (1) to (13), wherein the curve partially has a straight portion.

(15) The edge according to (2), wherein the curve is a curve in which the angle of a tangent to the curve at a predetermined part is 45° or less with respect to the normal, in a part of a total length that is 10% or less of the inner peripheral portion.

(16) A speaker unit, including:

a diaphragm that is displaced by a drive signal; and an edge that supports the diaphragm, the edge including:

an edge-shaped portion that is formed from an inner peripheral portion to an outer peripheral portion; and a groove portion that is formed in the edge-shaped portion and has a peak portion and a valley portion, wherein a ridge line of the valley portion of the groove portion extends from a start point on the inner peripheral portion side to an end point on the outer peripheral portion side so as to draw a continuously changing curve.

(17) A microphone, including:

a diaphragm that is displaced by sound pressure; and an edge that supports the diaphragm, the edge including:

an edge-shaped portion that is formed from an inner peripheral portion to an outer peripheral portion; and a groove portion that is formed in the edge-shaped portion and has a peak portion and a valley portion, wherein a ridge line of the valley portion of the groove portion extends from a start point on the inner peripheral portion side to an end point on the outer peripheral portion side so as to draw a continuously changing curve.

(18) An acoustic processing device that includes the speaker unit according to (16).

(19) An acoustic processing device that includes the microphone according to (17).

REFERENCE SIGNS LIST

10 Headphone
20R Speaker unit
22 Edge
41 Inner flat portion
42 Edge-shaped portion
43 Outer flat portion
44 Inner peripheral portion
45 Outer peripheral portion
46 Rib
46A Peak portion
46B Valley portion

The invention claimed is:

1. An edge, comprising:

an edge-shaped portion from an inner peripheral portion to an outer peripheral portion; and a first groove portion that is in the edge-shaped portion, wherein the first groove portion includes a peak portion and a valley portion, a ridge line of the valley portion of the first groove portion extends from a start point on a side of the inner peripheral portion to an end point on a side of the outer peripheral portion to draw a curve, the start point of the first groove portion is at a position offset from a center of the edge-shaped portion relative to the inner peripheral portion, and the end point of the first groove portion is at a position offset from the center of the edge-shaped portion relative to the outer peripheral portion.

2. The edge according to claim 1, wherein the start point is a point of intersection between a normal to the center of the edge-shaped portion and the inner peripheral portion.

3. The edge according to claim 2, wherein a first angle is between the normal and a tangent to a first part of a curve of the first groove portion, the first part of the curve is at a first distance from the start point of the curve, and a second angle is between the normal and a tangent to a second part of the curve of the first groove portion, the second part of the curve is at a second distance from the start point of the curve, the second distance is greater than the first distance, and the curve satisfies (first angle)≤(second angle).

4. The edge according to claim 3, wherein the curve is at least one of a circular arc, a spline curve, a sine curve, or a clothoid curve connecting the start point and the end point.

5. The edge according to claim 1, wherein a distance between a ridge line of the peak portion and the ridge line of the valley portion varies continuously.

6. The edge according to claim 5, wherein the distance between the ridge line of the peak portion and the ridge line of the valley portion increases from the start point to a specific part between the start point and the end point, and the distance between the ridge line of the peak portion and the ridge line of the valley portion decreases from the specific part to the end point.

7. The edge according to claim 1, wherein the edge-shaped portion is a convex portion that protrudes in at least one direction.

8. The edge according to claim 1, wherein the edge-shaped portion is a convex portion that protrudes in one direction.

9. The edge according to claim 8, further comprising an inner flat portion and an outer flat portion, wherein
- the inner peripheral portion is a boundary portion between the convex portion and the inner flat portion, and
- the outer peripheral portion is a boundary portion between the convex portion and the outer flat portion.

10. The edge according to claim 1, further comprising:
- a plurality of groove portions including the first groove portion, wherein
  - the plurality of groove portions are at approximately equal intervals with respect to the edge-shaped portion.

11. The edge according to claim 1, further comprising:
- a second groove portion in the edge-shaped portion; and
- a recess portion in the edge-shaped portion, wherein
  - the recess portion is smaller than the first groove portion and the second groove portion,
  - the recess portion is one of a convex portion or a concave portion,
  - the second groove portion is adjacent to the first groove portion, and
  - the recess portion is at least either between a part in vicinity of the start point of the first groove portion and a part in vicinity of a start point of the second groove portion, or between a part in vicinity of the end point of the first groove portion and a part in vicinity of an end point of the second groove portion.

12. The edge according to claim 1, wherein the curve includes at least two different curves.

13. The edge according to claim 1, wherein the curve partially includes a straight portion.

14. The edge according to claim 2, wherein
- the curve is a specific curve, in which an angle of a tangent to the specific curve at a first part is 45° or less with respect to the normal, in a part of a total length that is 10% or less of the inner peripheral portion.

15. A speaker unit, comprising:
- a diaphragm configured to be displaced by a drive signal; and
- an edge that supports the diaphragm, wherein
  - the edge includes:
    - an edge-shaped portion that is formed from an inner peripheral portion to an outer peripheral portion; and
    - a groove portion in the edge-shaped portion, wherein
    - the groove portion includes a peak portion and a valley portion,
    - a ridge line of the valley portion of the groove portion extends from a start point on a side of the inner peripheral portion to an end point on a side of the outer peripheral portion to draw a curve,
    - the start point of the groove portion is at a position offset from a center of the edge-shaped portion relative to the inner peripheral portion, and
    - the end point of the groove portion is at a position offset from the center of the edge-shaped portion relative to the outer peripheral portion.

16. A microphone, comprising:
- a diaphragm configured to be displaced by sound pressure; and
- an edge that supports the diaphragm, wherein
  - the edge includes:
    - an edge-shaped portion that is from an inner peripheral portion to an outer peripheral portion; and
    - a groove portion in the edge-shaped portion, wherein
      - the groove portion includes a peak portion and a valley portion,
      - a ridge line of the valley portion of the groove portion extends from a start point on a side of the inner peripheral portion to an end point on a side of the outer peripheral portion to draw a curve,
      - the start point of the groove portion is at a position offset from a center of the edge-shaped portion relative to the inner peripheral portion, and
      - the end point of the groove portion is at a position offset from the center of the edge-shaped portion relative to the outer peripheral portion.

17. An acoustic processing device that includes the speaker unit according to claim 15.

18. An acoustic processing device that includes the microphone according to claim 16.

* * * * *